United States Patent

Hirayama

(10) Patent No.: US 6,751,509 B2
(45) Date of Patent: Jun. 15, 2004

(54) METHOD FOR ACCESS CONTROL OF AGGREGATED DATA

(75) Inventor: Yuki Hirayama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 09/790,237

(22) Filed: Feb. 21, 2001

(65) Prior Publication Data

US 2001/0025281 A1 Sep. 27, 2001

(30) Foreign Application Priority Data

Mar. 27, 2000 (JP) ........................................ 2000-086293

(51) Int. Cl.$^7$ .............................................. G05B 11/01
(52) U.S. Cl. .......................... 700/21; 700/23; 700/79; 700/48; 713/200; 713/201; 713/166; 713/167; 709/223; 709/224; 709/315; 709/316
(58) Field of Search .............................. 700/21, 23, 79, 700/78, 48; 713/200, 201, 166, 164, 167; 709/223, 224, 225, 315, 316

(56) References Cited

U.S. PATENT DOCUMENTS 5,412,717 A * 5/1995 Fischer ........................ 713/156
5,481,700 A * 1/1996 Thuraisingham ................ 707/9
5,590,266 A * 12/1996 Carson et al. ............... 345/741
6,112,181 A * 8/2000 Shear et al. .................... 705/1
6,377,640 B2 * 4/2002 Trans ........................ 375/354
6,513,112 B1 * 1/2003 Craig et al. ..................... 713/1

OTHER PUBLICATIONS

"Security for Object–Oriented Database Systems", Millen et al., IEEE, 1992, pp. 260–272.*

* cited by examiner

Primary Examiner—Ramesh Patel
(74) Attorney, Agent, or Firm—Jerry W. Herndon; Carstens, Yee & Cahoon (57) ABSTRACT

A class manager stores the information which is divided into hierarchical classes, wherein each class includes a policy for showing how to treat the information according to the security level, and information generating rules showing how to generate the information. A shared data space temporarily stores information. An instance generator generates new information based on the information generating rules and writes it in the shared data space. A security enforcement provides the information with controlling as complying with the policy relating to the information in the shared data space. A monitor monitors the writing and generation of the information in the shared data space.

18 Claims, 8 Drawing Sheets

Table. 1

| Name | Employee number | Account number | Salary amount |
|---|---|---|---|
| Taro Yamada | 00001 | 25 | 500,000 |
| Jiro Tanaka | 00002 | 20 | 400,000 |
| Saburo Takahashi | 00003 | 10 | 300,000 |
| Shiro Sato | 00004 | 5 | 200,000 |

Fig. 11

METHOD FOR ACCESS CONTROL OF AGGREGATED DATA

FIELD OF THE INVENTION

The present invention relates to access control for a data aggregation, and more particularly to access control for an organized information aggregation such as forms.

BACKGROUND OF THE INVENTION

Form-type (i.e. document) data is mostly created with the following hierarchical structures. For example, a "form" is composed of one or more "records", and a "record" is composed of one or more "fields". The information such as a form, which has an hierarchically arranged structure, is likely to have different security levels depending on whether it exists alone or plurality of them are aggregated. Such a form-type data is utilized in companies whether utilizing a paper or an electronic infrastructure. This form-type data has the following features.

EData has a strong association between rows and columns.

EData is located two-dimensionally, so that it is possible to know the tendency of respective data once obtaining the information about entire form or whole or part of rows and columns.

EThough data in one cell, as such, is less important, when they aggregate they become more important.

According to these features, it is believed that form-type data needs particular security countermeasures that are different from normal documents. That is exactly access control (security) for an "information aggregation".

In banks, for example, requests for monetary processing are brought in from companies with a form-type document. For example, they are a request for salary deposits using plural entry documents. (Table 1 in FIG. 11, being not a salary deposit, is a simple example of plural entry documents.) Though the document shown by Table 1 is a very simple example, on actual documents are listed names of employees subject to a salary deposit, names of banks, names of bank branches, account numbers, salary amount, etc. Among this information, viewing only a cell in a column of "names of banks" alone (for example XYZ bank is written), is common information and is not considered to be so important in terms of security. However, once it is associated with an employee number, a name of bank branch, an account number, and the salary amount, it becomes private information, and makes the security level very high. Hereinafter, we will refer to a lateral row as a "record", a longitudinal column as a "column", and a cell (rectangular area) of each table as a "field".

Also in case of the salary amount, the sole existence of the figure may not become private information because which employee it belongs to is not known, so it's security level is not considered to be so high. However, an aggregation of salary amounts of all members can become important information as an index representing the company's circumstances, even though it isn't known which employee respective salaries belong to, so that it's security level becomes much higher compared to the salary amount alone.

In banks, many employees can access to this information based on business necessity. However, necessary information varies according to business affairs, and the accessible authority for information or an information aggregation should vary according to a duty position. For example, consider the case of inputting a request for salary deposits for a company to a host database of a bank. In terms of security, even the operators preferably should not see the private information and information showing the scale of business. However, minimum information for an operation necessarily needs to be seen.

Required minimum information for an operator is the information written in one cell. Therefor, the operator necessarily has the authority to read a cell. From the point of view of those who manage the input affairs, they want to avoid operators unnecessarily seeing the information with a high security level. Thus they append access control referred such as "unreadable to an operator" to a record, a column, and a form with higher security levels. This access control method is effective if an operator requests access in units of record, column and form, etc. However, if the operator requests access to several cells, which would result in information equal to that of a record, a column or a form, proper access control can not be done.

Conventional access control lists the information showing what operations the "subject" allows the "object" (this is called "access control list"), and access is controlled by referring to that list. However, with these methods it was difficult to represent different access control than for an object alone.

Alternatively there is a technique for posting fields of a form. Posting fields of a form is, for example, an operation to create one form (a plural entry form) from plural forms (such as single entry forms) according to a particular rule. With the conventional posting technique, a security level of a complete form is not particularly considered. More specifically, the security level of the form of the posting side is dependent on the security management function of the database saving it, and there could not be found a function for setting a security level based on the security level of the posting side, in terms of an information aggregation such as records and columns of a complete form.

Also in the field of database, research has been done on the difference of security levels between a primitive operation and an operation by a composite function. The primitive operation has a higher security level, thus when an operator with a lower security level than a predetermined level wants to perform a primitive operation on data, the operation can only be performed through a composite function encapsulating it. Namely, this is the management for operations, but not the management for the security level of a data aggregation.

OBJECTS OF THE INVENTION

It is therefor an object of the present invention to provide a method and system for access control for an information aggregation in order to solve problems mentioned above.

It is another object of the invention to provide a method and system for performing access control for plural objects which is different from access control for an object alone.

It is a further object of the invention to provide a method and system for performing the management of security levels for a data aggregation.

It is a further object of the invention to provide a method for setting a security level for an information aggregation to perform proper security enforcement.

It is a further object of the invention to provide a program storage media for storing a program for performing a method for management of access control and security levels described above.

SUMMARY OF THE INVENTION

In a first aspect of the present invention, an information offering system for providing a controlled information aggregation according to the security level of the information requester, comprises (1) a class manager for storing the information by dividing it into hierarchical classes, wherein each class includes a policy for showing how to treat the information according to the security level, and information generating rules showing how to generate the information; (2) a shared data space for temporarily storing information; (3) an instance generator for generating new information based on the information generating rules and writing it in the shared data space; (4) security enforcement for providing the information with control for complying with the policy relating to the information in the shared data space; and (5) a monitor means for monitoring the writing and generation of the information in the shared data space, wherein the monitor means acquires the information generating rules associated with new information from the class manager and sends the rules to the instance generator when new writing is detected, the monitor means acquires the policy of written information from the class manager based on the class of the information and sends the policy to the security enforcement when the generation is not detected despite the occurance of new writing in the shared data space.

Another aspect of the invention is an information offering method for providing a controlled information aggregation according to the security level of the information requester, using the classes of information which are hierarchically classified and stored, wherein each class includes a policy for showing how to treat the information according to the security level, and information generating rules showing how to generate the information, are provided. The method comprises the steps of: (1) using the class of required information to refer to the information generating rules and generating new information in a shared data space, wherein the shared data space is for temporarily storing information; (2) monitoring whether new information has been written in the shared data space; (3) acquiring the information generating rules associated with new information from its class when the new information has been written; (4) generating new information based on the information generating rules and writing it in the shared data space; (5) acquiring the information written in the shared data space, acquiring the policy from the class of the information, and providing controlled information as complying with all of the policies when no information is generated despite of new writing in the shared data space.

In a further aspect of the invention, a computer readable media for storing a program for providing a controlled information aggregation according to the security level of the information requester, by using the classes of information which are hierarchically classified and stored, wherein each class includes a policy for showing how to treat the information according to the security level, and information generating rules showing how to generate the information, is provided. The computer readable media comprises: (1) a function for using the class of required information to refer to the information generating rules and generating new information in a shared data space, wherein the shared data space is for temporarily storing information; (2) a function for monitoring whether new information has been written in the shared data space; (3) a function for acquiring the information generating rules associated with new information from its class when the information has been written; (4) a function for generating new information based on the information generating rules and writing it in the shared data space; (5) a function for acquiring the information written in the shared data space, acquiring the policy from the class of the information, and providing controlled information as complying with each of all policies when no information is generated despite new writing in the shared data space.

More specifically, the present invention has classes into which information is hierarchically classified, wherein actual information corresponds to an instance of each class. Each class can have "instance generating rules" and an "instance generator". An "instance generator" generates the instance of the same class or any other class based upon "instance generating rules". Within the instance generating rules of class A, for example, is written "instances of class A generate an instance of class B if three or more instances of class A aggregate", so it can transform the idea of "information aggregation" into the operation of "generating an instance of the other (or the same) class". A sole instance can utilize the conventional access control list. Therefor, it is possible to implement the security for an information aggregation within the conventional framework by using "instance generating rules" and an "instance generator".

The present invention is provided with a method for performing "instance generation" (information generation) recursively. For that purpose, it has a shared data space which allows all instances to be accessible to each class; a monitor for monitoring the shared data space (shared data space monitoring means); and above mentioned instance generator (information generating means). "Instance Generation" is performed by repeatedly writing to the shared data space, monitoring by the monitor, and instance generation, as one cycle, until the shared data space becomes static state. With this scheme for implementing recursive cycles, it becomes possible to generate a proper instance even for a class structure having a deep hierarchy, thereby providing proper security control. By replacing "performing security enforcement for an information aggregation" with "performing security enforcement as complying with all security policies of classes to which each of all instances belong", security enforcement for an information aggregation is implemented.

More specifically, the invention classifies information into hierarchical classes, provides "instance generating rules" and an "instance generator" for each class, and replaces the idea of "information aggregation" with the operation of an "instance generation", and replaces access control for the information aggregation with "access control for a generated instances". Thereby in terms of the method for access control, it becomes possible to use the conventional framework in the form of "access control per instance". This enables the use of large frameworks of access control such as when granting access control for an information aggregation to a previous system, and enables the control even in the case of forms with a deep hierarchy (security levels) by combining the shared data space and the shared data space monitoring means to enable recursive instance generation.

DETAILED DESCRIPTION OF A PREFERRED EMBODIMENTS

Figure 1:
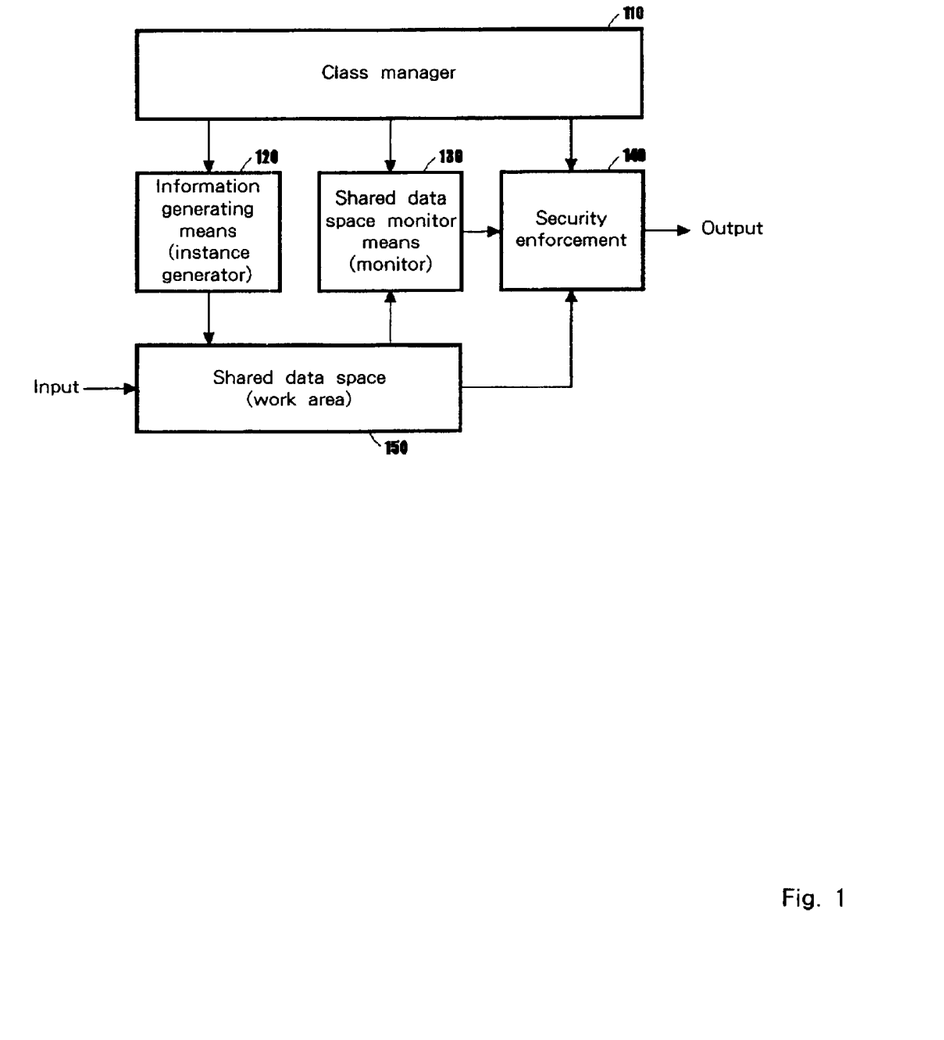
FIG. 1 is a block diagram of an information offering system of the present invention.

The configuration of an information offering system according to the present invention is depicted in FIG. 1. The invention takes the form of controlling the response of an information source to the user's requests, as shown in FIG. 1. FIG. 1 depicts the components of the invention. A class manager 110 corresponds to a class of information (instance), which holds security policies and information generating rules (instance generating rules), and which further manage IDs of instances which belong to an owning class.

The shared data space 150 (work area) is the shared data space for temporarily writing instances to calculate the security levels. This writing can be done in two ways. One is to directly write them upon a user's requests, the other is to write them with the information generating means 120 (instance generator). An instance that is directly written by a user's requests (information sources) is called real instance (information), whereas an instance that is written by the instance generator is called virtual instance (information). The term simply referred to as "information" hereinafter shall include the above real instance, virtual instance, and the finally controlled output information.

The shared data space monitoring means 130 (monitor) monitors an instance (information) written in the work area 150 and checks whether the applicable instance generating rules exist or not. The instance generating rules are acquired from the class manager 110. If any applicable ones exist, it applies them and sends the results to the information generating means 120 (instance generator). If none is applicable, it issues the enforcement command to the security enforcement 140.

The information generating means 120 (instance generator) generates an instance based upon the command from the shared data space monitoring means 130, and writes it to the shared data space 150 (work area). At that time it grants an ID to the instance based upon the class manager 110.

The security enforcement 140 is a module for actually controlling output information based upon the policy of the class manager 110. It controls the information by synthetically judging from the instances residing in the shared data space 150, the policies of their classes, and the information on the user who accessed and the access environment.

Figure 2:
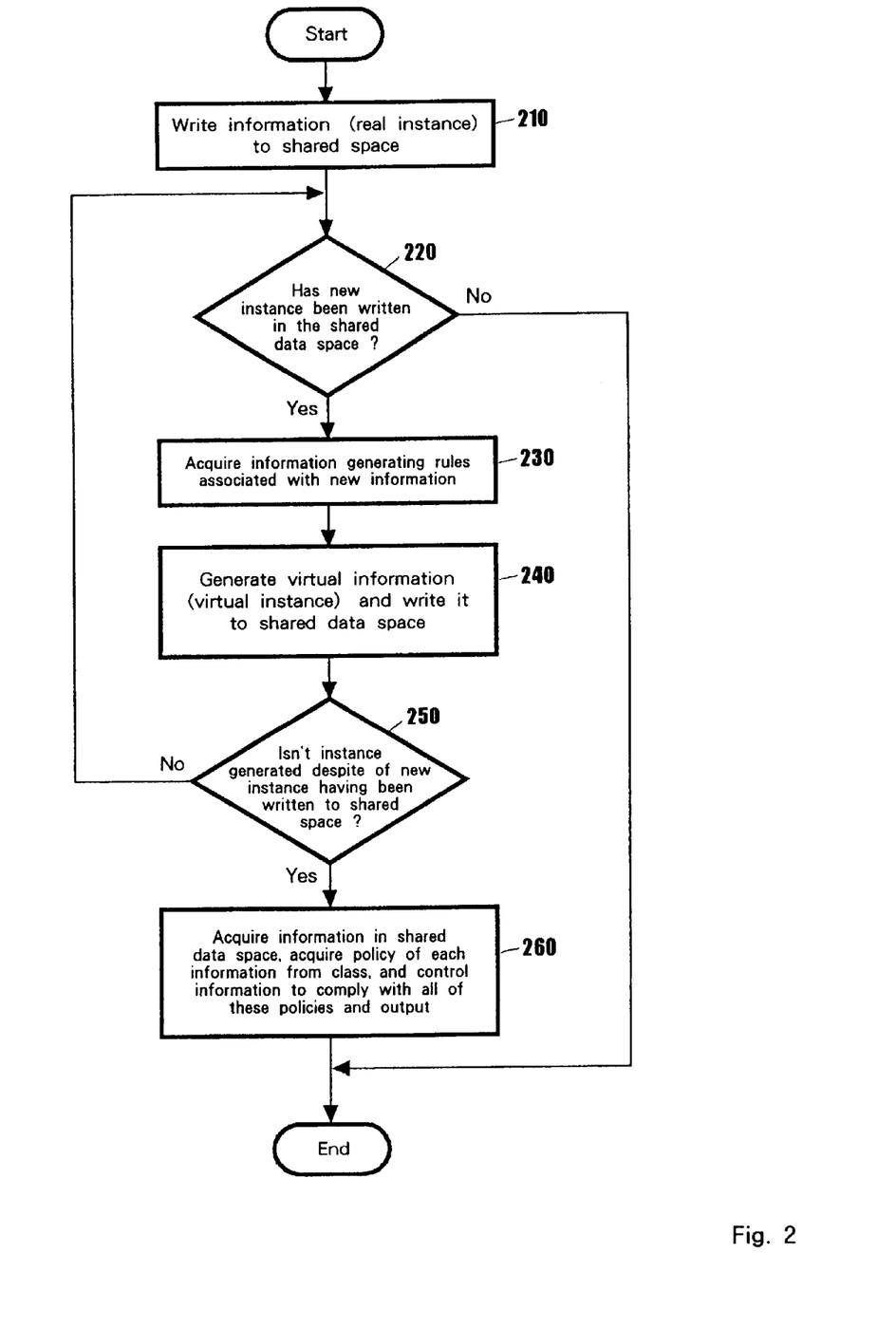
FIG. 2 is a flowchart of the processing performed in an information offering system of the present invention.

FIG. 2 depicts a flowchart of the process of the present invention. First in step 210, the process writes the information (real instances) on user requests (information sources) to the shared data space 150. Next in step 220, the shared data space monitoring means 130 monitors the instances written to the shared data space 150 and knows whether a new instance (information) has been written there. If a new instance has been written, in step 230, the process acquires the instance generating rules associated with the newly written instance from the class manager 110. The process issues a command to the information generating means (instance generator) to generate a new instance based on the instance generating rules. The information generating means (instance generator) acquires information on generation from the class manager 110. Then in step 240, the information generating means (instance generator) generates a virtual instance and writes it to the shared data space 150 (work area). Next in step 250, if the instance is not generated despite the new instance having been written to the shared data space, the shared data space monitoring means 130 issues an enforcement command to the security enforcement 140. In step 260, the security enforcement 140 finally acquires the instances written to the shared data space 150, acquires the policy of each class of those instances from the class manager 110, and controls the information to comply with all of these policies. Finally in relation to the information that the user tried to acquire, the process provides the information controlled by the security enforcement 140.

Figure 10:
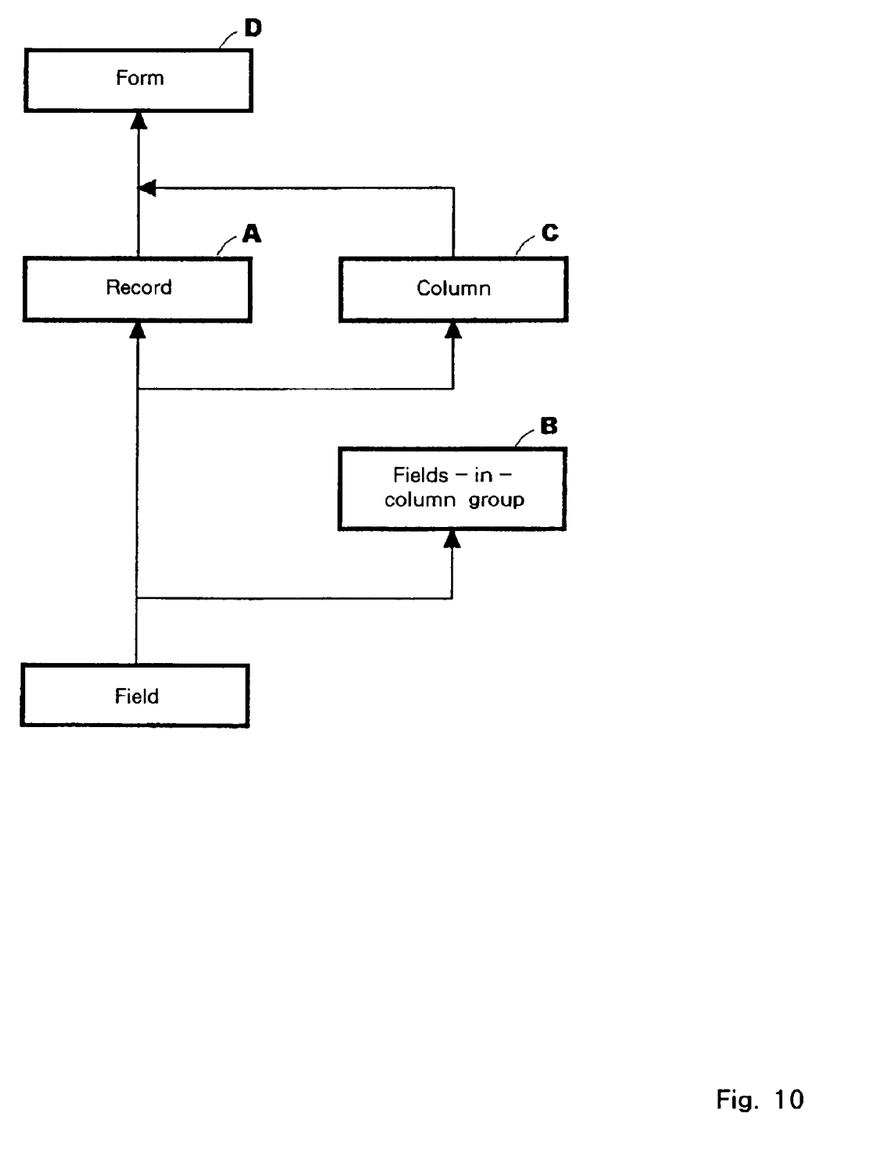
FIG. 10 is a diagram for illustrating a hierarchical structure of classes according to the present invention.
Figure 11:
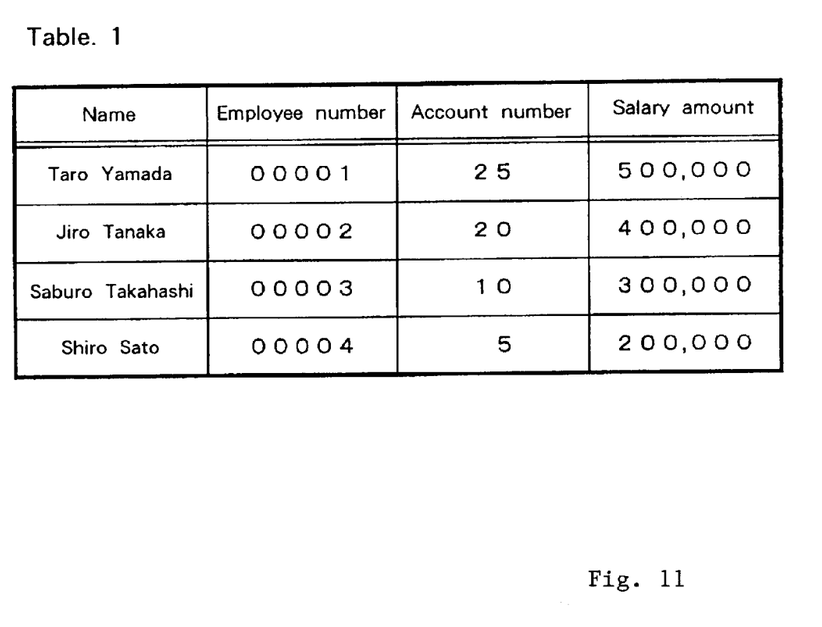
FIG. 11 is an exemplary employee payroll table.

Now referring to the form of table 1 of FIG. 11, the configuration of the present invention will be detailed. In the form of table 1, assume five classes, for example, forms, records, columns, field-in-column groups and fields, and define the hierarchical relations between them as shown in FIG. 10. In FIG. 10, "hierarchical relations" indicate that upper-level instances are generated from lower-level instances.

In Table 1 and FIG. 10, the following is, for example, considered as instance generating rule.

(1) "First record" is generated by four fields of "Taro Yamada", "00001", "25", and "500,000".

(2) "Third column" is generated by four fields of "500,000", "400,000", "300,000", and "200,000".

(3) A form is generated by the first, second, third and fourth records.

(4) A form is generated by the first, second, and third columns.

(5) A field-in-column group is generated when three or more fields in the same column are aggregated.

In Table 1 and FIG. 10, the following are, for example, considered as policies of the classes.

A. Records: A general user must not display this record with other information at the same time.

B. Field-in-column groups: A general user can not see them.

C. Columns: Only chief operators or higher can see them.

D. Forms: Only an administrator can see them.

Figure 3:
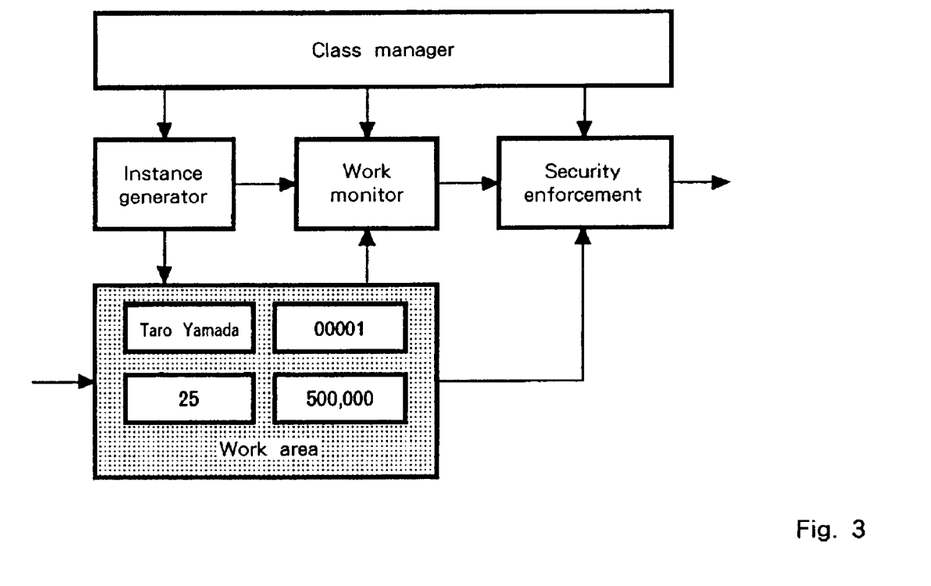
FIG. 3 is a block diagram showing a detail operation of an information offering system of the present invention.
Figure 4:
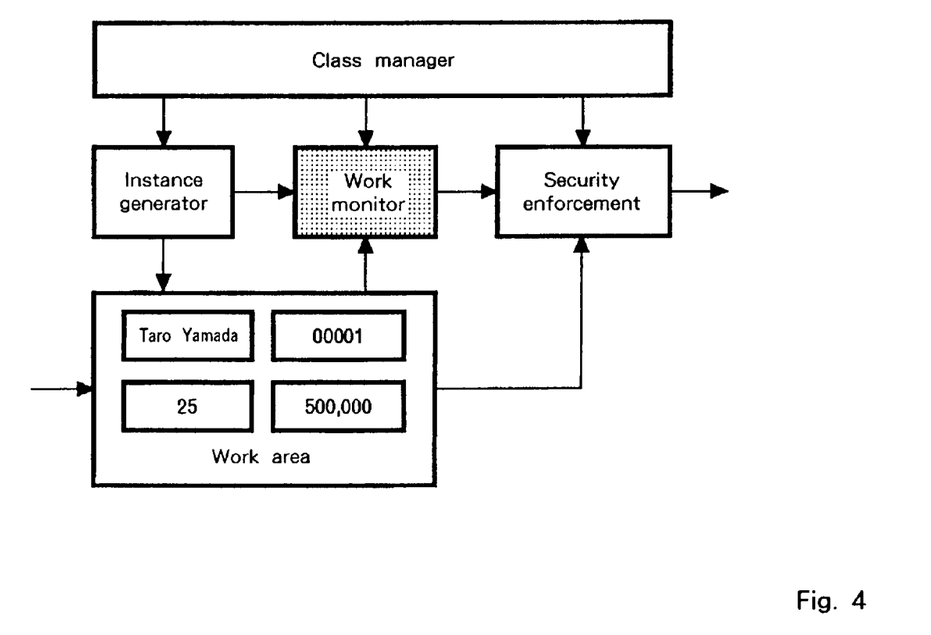
FIG. 4 is a block diagram showing a detail operation of an information offering system of the present invention.
Figure 5:
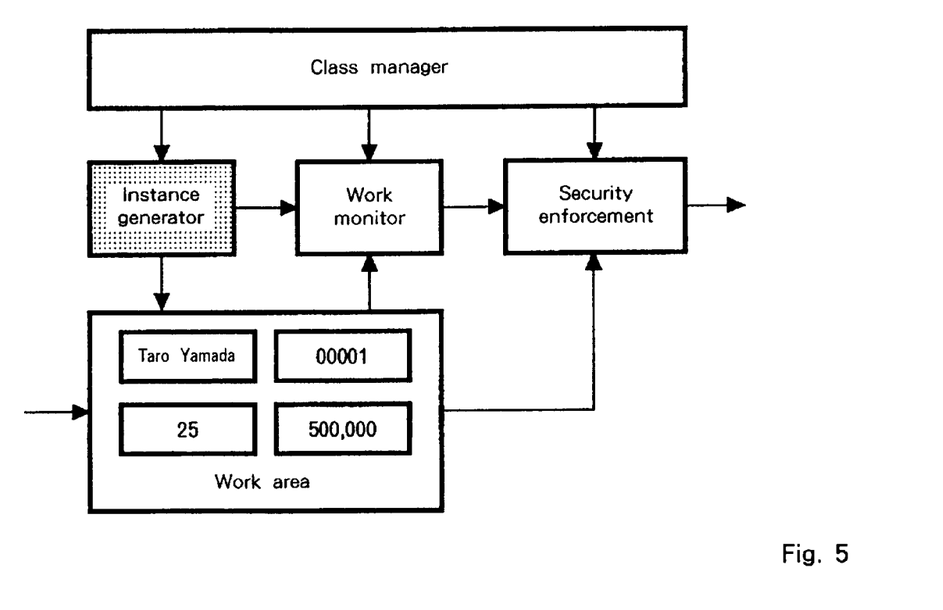
FIG. 5 is a block diagram showing a detail operation of an information offering system of the present invention.
Figure 6:
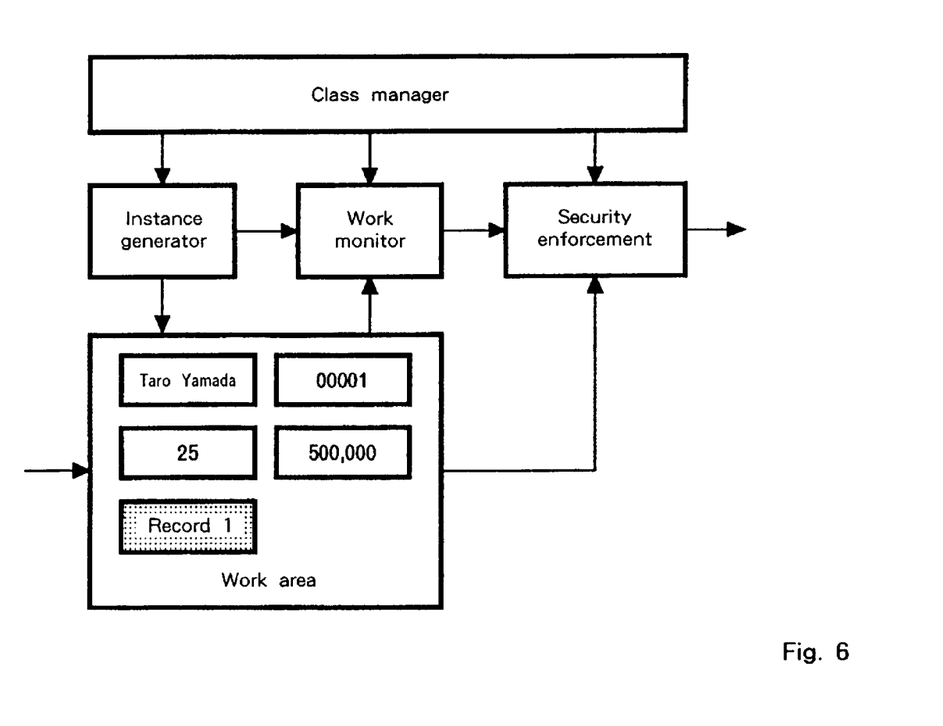
FIG. 6 is a block diagram showing a detail operation of an information offering system of the present invention.
Figure 7:
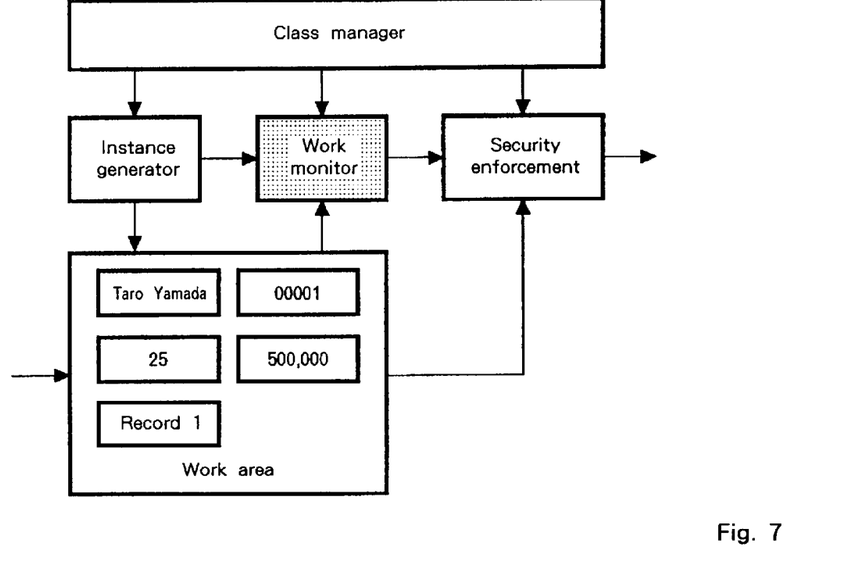
FIG. 7 is a block diagram showing a detail operation of an information offering system of the present invention.
Figure 8:
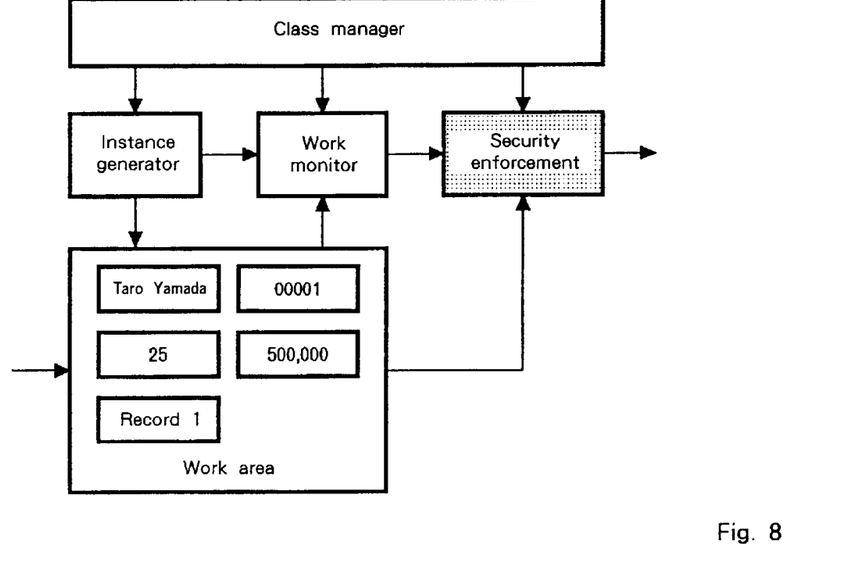
FIG. 8 is a block diagram showing a detail operation of an information offering system of the present invention.

FIG. 3 to FIG. 8 illustrate examples of detail operations of the present invention. FIG. 3 depicts that an operator has requested the display of four fields of "Taro Yamada", "00001", "25" and "500,000". First, these four fields information is written to the shared data space 150. These instances are real instances. FIG. 4 depicts that the shared data space monitoring means 130 monitors the shared data space 150 to find that new instances have been written there, and issues a command to the information generating means 120 to check whether it is possible to generate a new instance. FIG. 5 depicts that the information generating means 120 checks whether it is possible to generate a new instance from the instances written to the shared data space 150. FIG. 6 depicts that the information generating means 120 writes a record of a new instance based upon the instance generating rules. This new instance is a virtual instance. FIG. 7 depicts that responding to the virtual instance having been written to the shared data space 150, the shared data space monitoring means 130 issues a command again to the information generating means 120. However, since the information generating means 120 does not generate a new instance, the shared data space monitoring means 130 determines that the shared data space 150 has entered the static state, and issues a command to the security enforcement 140 to apply the policies of classes to enforce a proper security. This is depicted in FIG. 8. In this case, not only the policy of fields but the policy of records is applied.

Figure 9:
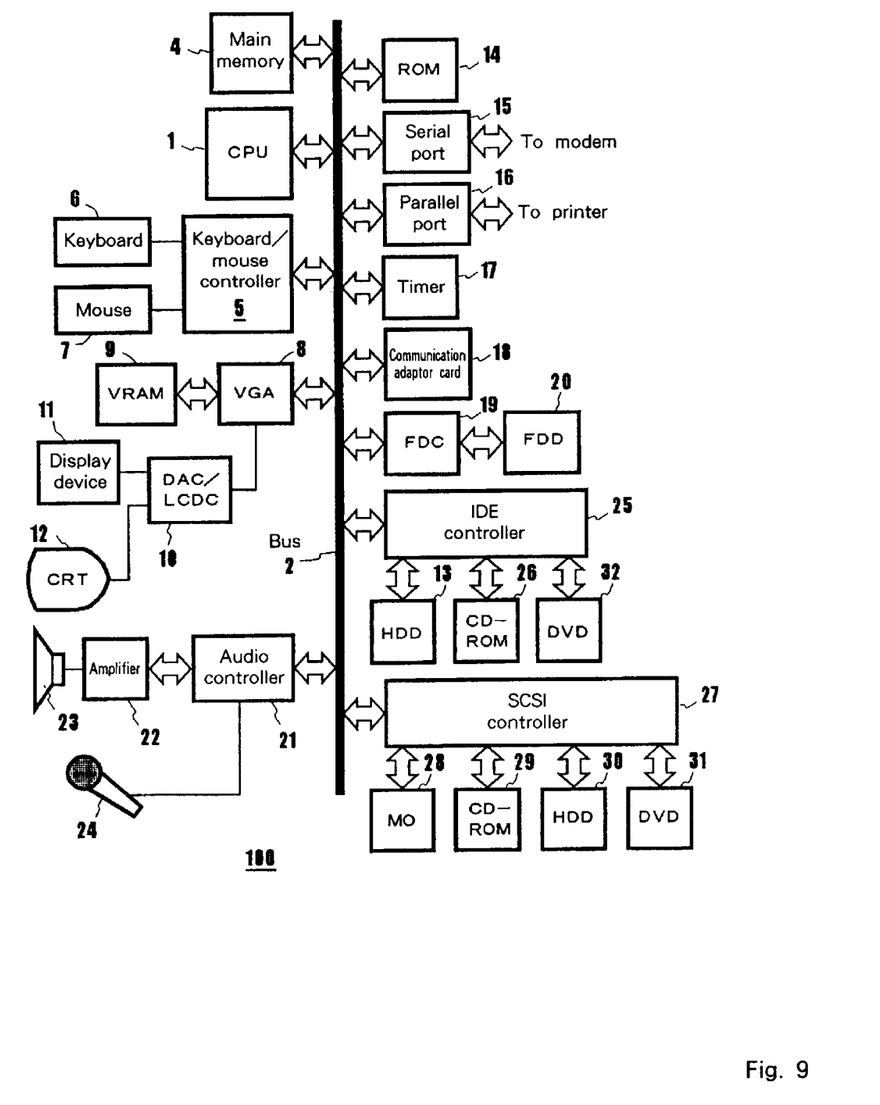
FIG. 9 shows an example of a typical hardware configuration used in a system of the present invention.

FIG. 9 depicts one embodiment of the typical computer hardware configuration used in an information offering system of the present invention. The system 100 includes a central processing unit (CPU) 1 and a memory 4. The CPU 1 and the memory 4 are connected to a hard disk drive 13 (or storage media drives such as CD-ROM 26, DVD 32) for a secondary storage via a bus 2 and an IDE controller 25. Likewise, the CPU 1 and the memory 4 are connected to a hard disk drive 30 (or storage media drives such as MO 28, CD-ROM 29, DVD 31) for a secondary storage via the bus 2 and an SCSI controller 27. Floppy-disk drive 20 is connected to the bus 2 via a floppy-disk controller 19.

A floppy disk is inserted into the floppy-disk drive 20. On this floppy-disk, the hard disk drive 13 (or storage media such as CD-ROM 26, DVD 32), or a ROM 14, a computer program that cooperates with an operating system to give instructions to the CPU, and a code or data for the operating system may be recorded. They are loaded to the memory 4 in order to be executed. Preferably, within the memory 4, the shared data space 150 and the class manager 110 are reserved, and programs for the information generating means 120, the shared data space monitoring means 130 and the security enforcement 140 are stored and executed. The codes for these computer programs may be compressed or divided into multiple sections to record them on multiple recording media. It is also possible to record the program for implementing the invention on a recording media such as a diskette, and operate it on the other computer.

The system 100 further may be equipped with user interface hardware such as a pointing device 7 (mouse, joystick, etc.) for inputting, a keyboard 6 and display 12. Further, connecting a printer via a parallel port 16 or connecting a modem via a serial port 15 is possible. This system 100 can also connect to a network via a serial port 15 and a modem or a communication adapter 18 (Ethernet or Token Ring card), and communicate with other computers, servers, etc. You may also connect a remote transceiver to the serial port 15 or parallel port 16 to send and receive data with infrared light or radio waves.

The speaker 23 receives sound and audio signals which were D/A (digital-to-analog) converted with the audio controller 21 via the amplifier 22, and outputs as sound and voice. The audio controller 21 also A/D (analog-to-digital) converts the audio information received from the microphone 24, thereby enabling the bringing in of audio information from outside the system into the system.

In this way, it is easily understood that the information offering system of the present invention is implemented with a communication terminal including a usual personal computer (PC) and workstation, notebook PC, palmtop PC, network computer, home electric appliances such as a television set having a computer built-in, game machine having a communication facility, telephone set, facsimile, cellular phone, PHS (Personal Handyphone System), electronic databook, or a combination thereof. However, these components are exemplification, so all of them need not be an essential component of the invention.

As mentioned above, according to the present invention, a recursive instance generation becomes possible, thereby enabling the control of a form having a deep security level. The present invention is particularly effective in a closed system such as a financial institution, a medial institution and a public institution (a public office), where people with various security levels access information in table form and interaction with outside world occurs widely and mundanely. Also some effect can be brought about in an open system like Internet by filing all the outputs from information sources according to the present invention.

What is claimed is:

1. An information offering system for providing controlled information aggregation according to a security level of an information requester, comprising:
   (1) a class manager for storing information divided into hierarchical classes, wherein each class includes a policy for showing how to treat the information according to the security level, and information generating rules showing how to generate information instances;
   (2) a shared data space for temporarily storing information instances;
   (3) an instance generator for generating a new information instance based on the information generating rules and writing said new information instance into the shared data space;
   (4) security enforcement for providing the new information instance and for controlling a policy relating to the new information instance in the shared data space; and
   (5) monitor means for monitoring the writing and generation of information in said shared data space.

2. The information offering system of claim 1, further comprising:
   writing a real information instance in the shared data space responsive to a user request.

3. The information offering system of claim 1, wherein the new information instance is a virtual information instance written by the instance generator.

4. The information offering system of claim 1, wherein the hierarchical classes include forms, records, columns, field-in-column groups, and fields.

5. The information offering system of claim 1, wherein the monitor means acquires information generating rules associated with information instances from said class manager and sends said rules to said instance generator when a new writing is detected.

6. The information offering system of claim 1, wherein the monitor means acquires policy of a written information instance from said class manager based on a class of the written information instance and sends the policy to said security enforcement when said generation is not detected despite new writing in said shared data space.

7. An information offering method for providing a controlled information aggregation according to a security level of an information requester, using classes of information which are hierarchically classified and stored, wherein each class includes a policy for showing how to treat the information according to the security level, and information generating rules showing how to generate information instances, the method comprising the steps of:
   (1) using a class of required information to refer to the information generating rules and generating a first information instance in a shared data space, wherein the shared data space is for temporarily storing information instances;
   (2) monitoring whether a first information instance has been written in the shared data space;
   (3) acquiring information generating rules associated with the first information instance from its class when the first information instance has been written;

(4) generating a new information instance based on the information generating rules and writing the new information instance in the shared data space;

(5) acquiring the information written in the shared data space.

8. The information offering method of claim 7, wherein the first information instance is a real information instance written responsive to a user request.

9. The information offering method of claim 7, wherein the new information instance is a virtual information instance written by the instance generator.

10. The information offering method of claim 7, wherein the hierarchical classes include forms, records, columns, field-in-column groups, and fields.

11. The information offering method of claim 7, further comprising:

acquiring a policy from the class of the information.

12. The information offering method of claim 7, further comprising:

providing controlled information as complying with all policies when no information is generated despite of new writing in said shared data space.

13. A computer readable media for storing a program for providing a controlled information aggregation according to a security level of an information requestor, by using classes of information which are hierarchically classified and stored, wherein each class includes a policy for showing how to treat information according to the security level, and information generating rules showing how to generate information instances, comprising:

(1) a function for using a class of requested information to refer to information generating rules and for generating a first information instance in a shared data space, wherein the shared data space is for temporarily storing information instances;

(2) a function for monitoring whether the first information instance has been written in the shared data space;

(3) a function for acquiring information generating rules associated with the first information instance from its class when the first information instance has been written;

(4) a function for generating a new information instance based on the information generating rules and writing the new information instance in the shared data space;

(5) a function for acquiring information written in the shared data space.

14. The computer readable media of claim 13, wherein the first information instance is a real information instance written responsive to a user request.

15. The computer readable media of claim 13, wherein the new information instance is a virtual information instance written by the instance generator.

16. The computer readable media of claim 13, wherein the hierarchical classes include forms, records, columns, field-in-column groups, and fields.

17. The computer readable media of claim 13, further comprising:

a function for acquiring a policy from the class of the information.

18. The computer readable media of claim 13, further comprising:

a function for providing controlled information as complying with all policies when no information is generated despite of new writing in said shared data space.

* * * * *